Patented Dec. 18, 1945

2,391,219

UNITED STATES PATENT OFFICE 2,391,219

PREPARATION OF ACIDS

Edward Payson Bartlett, Wilmington, Del., assignor to E. I. du Pont de Nemours & Company, Wilmington, Del., a corporation of Delaware No Drawing. Application September 25, 1942, Serial No. 459,740

5 Claims. (Cl. 260—541)

This invention relates to a process for the preparation of acids and more particularly to the preparation of organic acids from their esters by hydrolysis under pressure.

The well-known process of converting an ester into an alcohol and an acid salt, in particular that of fats into soaps by means of alkalies, is well known, as well as the hydrolysis of the glycerolester to a free alcohol and ester salt. Such processes are generally characterized as involving saponification although they are sometimes referred to as involving hydrolysis. The process of this invention relates to the conversion of esters to acids with alcohols being incidentally prepared but, in contradistinction to saponification, is directed specifically to the reaction of an organic ester with water in the presence or absence of an acid catalyst.

An object of the present invention is to provide an improved process for converting organic esters to their corresponding acids. Another object is to provide a process for carrying out such conversion under elevated pressures. A further object is to provide a process for the conversion of aliphatic organic acid esters to corresponding organic acids and alcohols wherein the reaction is conducted under pressure and the products of the reaction are also separated under pressure. A further object is to provide a highly efficient process for the preparation of acids and alcohols from esters which give azeotrope-forming esters and alcohols, the conversion of the ester and the separation of the acid and alcohol being conducted under pressure. Other objects and advantages of the invention will hereinafter appear.

According to the invention, an organic ester is converted in the presence of water to its corresponding acid and alcohol by heating under pressure in the presence or absence of a hydrolysis catalyst and subsequently the alcohol formed and unreacted ester are distilled off under pressure, leaving as a residue the desired acid. The alcohol and ester are separated by known means and the latter returned to the conversion zone.

The efficiency of such a process is measured by the amount of alcohol removed; for every molecule of alcohol distilled over a molecule of acid is formed. Because of the change in azeotropic composition with pressure, pressure operation makes it possible to increase many fold the alcohol removed and, as a consequence, thereby to increase the efficiency of the process and greatly to increase the capacity of any given equipment. In addition to the aforesaid considerations, operating the conversion step under pressure increases the rate of reaction, the time required to reach optimum conversion being decreased from several hours to a matter of minutes. For instance, in the case of a mixture of methyl acetate and water, at 180° C., the pressure is at 350 to 400 pounds per square inch and hydrolysis equilibrium is established in six minutes, whether or not an acid catalyst is present.

The conversion and the distillation of the alcohols therefrom are conducted in accord with the invention at pressures ranging between 40 to 1000 pounds per square inch or more, the limiting factor on the high side being governed by the strength of the equipment used. The reaction should be conducted at substantially the boiling point of the reaction mixture under the pressure employed. For the conversion of methyl acetate to acetic acid, pressures ranging between 200 and 500 pounds per square inch, at corresponding temperatures ranging between 140 and 235° C. have been found to give especially efficient operation.

The reaction may be further accelerated by the use of a suitable hydrolysis catalyst such, for example, as hydrochloric acid, sulfuric acid, paratoluene sulfonic acid, boron trifluoride and its hydration and addition products and similar suitable hydrolysis catalysts. As has been stated, however, pressure considerably accelerates the rate of the reaction and, at higher pressures, in many instances, no catalysts are required, inasmuch as the reaction rate is sufficiently high in their absence. The reaction is conducted in the presence of water and there should be present at least two moles of water per mole of ester.

The process may be used for the preparation of acid from esters such, for example, as the methyl, ethyl, normal and isopropyl, normal and isobutyl, amyl, hexyl, octyl, nonyl, dodecyl and higher straight and branch chain alcohol esters of formic, acetic, propionic, butyric, valeric, and the higher straight and branch chain aliphatic organic acids, as well as hydroxyacetic, lactic, acrylic, crotonic, oxalic, adipic, and higher mono and polybasic aliphatic organic acids as well as similar esters of the aromatic acids such as benzoic, toluic, etc.

Examples will now be given illustrating embodiments of the invention in which parts are by weight unless otherwise indicated.

*Example 1.*—A pressure still provided with a copper column packed with copper rings and fitted with a reflux head was charged with a 50% by weight aqueous methyl acetate solution containing 0.1% sulfuric acid. The packed column was equivalent to about six theoretical plates. Heat was applied and a pressure allowed to build up to approximately 400# per square inch, at which pressure the head temperature was approximately 180° C., and the pot temperature 210° C. Distillation was started without further processing and the following distillation data obtained:

[Pressure, 400 lbs. Reflux ratio, 5/1. Charge 1000 parts of water and 1000 parts of methyl acetate.]

| Cut | Time, min. | Temperature | | Distillate | | | | |
|---|---|---|---|---|---|---|---|---|
| | | Head °C. | Pot °C. | Parts | Per cent MeOAc | Per cent $H_2O$ | Per cent HOAc | Per cent MeOH |
| 1 | 15 | 179 | 212 | 74.8 | 34.0 | 19.1 | 0.7 | 46.2 |
| 2 | 15 | 179 | 215 | 114.6 | 58.2 | 6.7 | 0.3 | 34.8 |
| 3 | 15 | 180 | 218 | 85.3 | 64.5 | 5.4 | 0.0 | 30.0 |
| 4 | 15 | 180 | 221 | 78.1 | 64.0 | 5.5 | 0.0 | 30.5 |
| 5 | 15 | 181 | 224 | 66.9 | 65.0 | 5.5 | 0.0 | 29.5 |
| 6 | 15 | 181 | 227 | 80.9 | 66.0 | 5.9 | 0.0 | 28.1 |
| 7 | 15 | 182 | 231 | 60.8 | 67.2 | 6.1 | 0.0 | 26.7 |
| 8 | 15 | 182 | 232 | 47.7 | 68.8 | 6.8 | 0.0 | 24.7 |
| 9 | 15 | 180 | 232 | 47.7 | 68.7 | 6.8 | 0.0 | 24.5 |
| 10 | 15 | 226 | 232 | 58.9 | 70.2 | 7.6 | 0.0 | 22.2 |
| Pot residue | | | | 1,300.0 | 1.79 | | 28.15 | |

During the distillation about 45% of the ester was converted to acetic acid and methanol.

*Example 2.*—An apparatus similar to that described in Example 1 was charged with 1000 parts of water, 1010 parts of methyl acetate and 2.09 parts of sulfuric acid (95.5%). Heat was applied until a pot temperature of approximately 212° C. and a head temperature of 179° C. were obtained. Without further processing the reaction mixture was distilled and the following data obtained:

TABLE 5

*Hydrolysis of methyl acetate*

[Pressure, 400 lbs. Reflux ratio, 1/1.]

| Cut | Time, min. | Temperature | | Distillate | | | | |
|---|---|---|---|---|---|---|---|---|
| | | Head °C. | Pot °C. | Parts | Per cent MeOAc | Per cent $H_2O$ | Per cent HOAc | Per cent MeOH |
| 1 | 15 | 179 | 212 | 61.7 | 49.5 | 6.9 | 1.3 | 40.6 |
| 2 | 15 | 177 | 213 | 53.1 | 51.1 | 8.9 | 0.0 | 40.0 |
| 3 | 15 | 135 | 216 | 26.2 | 53.5 | 10.7 | 0.0 | 35.8 |
| 4 | 30 | 170 | 217 | 109.1 | 58.2 | 7.5 | 0.0 | 34.3 |
| 5 | 15 | 171 | 219 | 32.2 | 60.5 | 4.4 | 0.0 | 35.1 |
| 6 | 15 | 172 | 221 | 41.8 | 62.4 | 3.1 | 0.0 | 34.5 |
| 7 | 15 | 179 | 224 | 57.7 | 62.9 | 5.0 | 0.0 | 32.1 |
| 8 | 15 | 170 | 227 | 104.3 | 65.9 | 5.9 | 0.0 | 28.2 |
| 9 | 15 | 179 | 229 | 29.4 | 72.4 | 8.2 | 0.0 | 19.4 |
| 10 | 15 | 178 | 229 | 20.7 | 70.6 | 8.8 | 0.0 | 20.6 |
| 11 | 15 | 194 | 229 | 35.3 | 71.5 | 8.5 | 0.0 | 20.0 |
| 12 | 15 | 229 | 229 | 112.8 | 53.9 | 25.8 | 2.2 | 18.1 |
| 13 | 15 | 229 | 229 | 96.9 | 4.2 | 80.3 | 12.6 | 1.9 |
| Pot residue | | | | 1,220.0 | 0.78 | 62.3 | 36.3 | |

In this case, 55% of the ester was converted to acetic acid and methanol.

In Examples 1 and 2 the methanol distilled over ranged from a maximum of 46.2 to a minimum of 18.1%. In contradistinction to this high methanol removal, atmospheric pressure operation in practice requires from 7 to 8 hours for the hydrolysis step, while during distillation the methanol content of the distillate averages 8–10%.

The efficiency of the pressure system in this instance can of course be greatly increased over that demonstrated, if one employs a more effective column and a higher reflux ratio. The maximum efficiency would be accompanied by the production of an anhydrous binary of methanol and methyl acetate which at 400 lbs. has the composition: 58% methanol, 42% methyl acetate. This corresponds to 76% conversion of ester to acid and alcohol.

I claim:

1. In a process of converting methyl acetate to acetic acid, the step which comprises heating a mixture of the methyl acetate and water under pressures between 200 and 500 pounds per square inch while separating the methanol by distillation under a similar pressure.

2. In a process of converting methyl acetate to acetic acid, the step which comprises boiling a mixture of the methyl acetate and water under pressures between 200 and 500 pounds per square inch while separating the methanol by distillation under a similar pressure.

3. In a process of converting methyl acetate to acetic acid, the steps which comprise heating a 50:50 by weight mixture of methyl acetate and water containing approximately 0.1% sulfuric acid to a temperature between 179 and 226° C., at a pressure of approximately 400 pounds per square inch while distilling the methanol and methyl acetate from the reaction mixture under the same pressure.

4. In a process of converting ethyl acetate to acetic acid, the step which comprises heating a 50:50 by weight mixture of ethyl acetate and water containing approximately 0.1% sulfuric acid to a temperature between 125 and 235° C. at a pressure between 40 and 600 pounds per square inch pressure while distilling the ethanol formed and ethyl acetate from the reaction mixture under the same pressure.

5. In a process of converting an ester of acetic acid selected from the group consisting of methyl acetate and ethyl acetate to acetic acid, the step which comprises heating a mixture of the ester of acetic acid and water under a pressure between 40 and 600 lbs. per. sq. in., while separating by distillation the alcohol formed under a similar pressure.

EDWARD PAYSON BARTLETT.